United States Patent
Agrawal

(10) Patent No.: US 6,846,571 B1
(45) Date of Patent: Jan. 25, 2005

(54) POLYMER BLEND FOR AUTOMOTIVE FLOORING APPLICATIONS

(76) Inventor: Raj K. Agrawal, 1293 Winter Ridge Ct. NE., Ada, MI (US) 49301

( * ) Notice: Subject to any disclaimer, the term of this patent is extended or adjusted under 35 U.S.C. 154(b) by 149 days.

(21) Appl. No.: 10/264,144

(22) Filed: Oct. 3, 2002

(51) Int. Cl.$^7$ ............................................. B32B 27/28
(52) U.S. Cl. ...................... 428/515; 428/522; 428/516; 428/517; 428/523; 525/88; 525/95; 525/232; 525/241; 524/495; 524/425; 524/423; 524/445; 524/451; 524/497; 524/492
(58) Field of Search ................................ 428/512, 522, 428/516, 517, 523, 515; 525/88, 232, 240, 242, 95, 241; 524/474, 495

(56) References Cited

U.S. PATENT DOCUMENTS

| | | | |
|---|---|---|---|
| 3,594,452 A | | 7/1971 | De La Mare et al. ...... 260/380 |
| 4,048,255 A | * | 9/1977 | Hillier et al. ................... 525/71 |
| 4,117,035 A | * | 9/1978 | Hillier et al. ................. 524/504 |
| 4,177,184 A | | 12/1979 | Condon ................. 260/32.6 A |
| 4,197,377 A | | 4/1980 | Bohm et al. .................... 525/99 |
| 4,216,132 A | | 8/1980 | Zweig et al. ......... 260/33.6 AQ |
| 4,520,138 A | | 5/1985 | Himes ........................... 521/91 |
| 4,525,533 A | * | 6/1985 | Bertrand et al. ............... 525/98 |
| 4,882,378 A | | 11/1989 | Himes ......................... 524/505 |
| 4,904,725 A | | 2/1990 | Himes ......................... 524/505 |
| 5,723,543 A | * | 3/1998 | Modic .......................... 525/98 |
| 5,853,874 A | * | 12/1998 | Jacob .......................... 428/343 |
| 5,905,097 A | * | 5/1999 | Walther ........................ 521/82 |
| 5,916,959 A | * | 6/1999 | Lindquist et al. ........... 524/505 |
| 6,471,731 B1 | * | 10/2002 | Elliott et al. .................. 44/275 |
| 6,531,544 B1 | * | 3/2003 | Vaughan et al. .............. 525/89 |
| 2002/0049276 A1 | * | 4/2002 | Zwick ......................... 524/476 |
| 2003/0181584 A1 | * | 9/2003 | Handlin et al. ................ 525/88 |

OTHER PUBLICATIONS

Vector 2411—Dexco Polymers product brochure.*

* cited by examiner

Primary Examiner—Tatyana Zalukaeva
Assistant Examiner—Rip A. Lee
(74) Attorney, Agent, or Firm—Price, Heneveld, Cooper, DeWitt & Litton

(57) ABSTRACT

A polymer blend suitable for use in automotive floor covering applications includes 100 parts by weight of a radial block copolymer having the general formula $(AB)_nBA$, wherein n is greater than 1, each block A is a monoalkenyl arene polymer block and each block B is an elastomeric conjugated diene polymer block; from about 5 to about 200 parts by weight of a mineral oil; and from about 5 to about 300 parts by weight of a 1-olefin polymer. The resulting polymer blend may be formed into sheet materials which are recyclable, and which may exhibit low gloss and excellent tactility similar to vulcanized rubber. Further, the polymer blends of this invention may exhibit excellent grain retention, abrasion resistance, heat stability, and ultraviolet light stability.

22 Claims, 1 Drawing Sheet

POLYMER BLEND FOR AUTOMOTIVE FLOORING APPLICATIONS

FIELD OF THE INVENTION

This invention relates to polymer blends and more particularly to polymer blends useful for preparing sheet materials that exhibit low gloss and high tactility.

BACKGROUND OF THE INVENTION

While most vehicles, especially automobiles, have carpeted floors, various commercial, agricultural, construction and sports and recreational vehicles have non-carpeted floors to facilitate easy cleaning and to resist soiling.

Until relatively recently, vulcanized rubber sheet material was commonly used as floor coverings for vehicles. Vulcanized rubber can be formed into sheet materials that are relatively inexpensive, and which exhibit low gloss and good tactility for vehicle floor covering applications. However, vulcanized rubber is not recyclable. Spent vulcanized rubber components generally must be disposed of in a landfill. It is of course more desirable to use materials that can be easily recycled, i.e. processed for use in another application. Another problem with vulcanized rubber floor coverings is that they are usually relatively thick and heavy, and therefore have an undesirable effect on vehicle fuel economy.

A relatively inexpensive alternative to vulcanized rubber is polyvinyl chloride floor coverings. Polyvinyl chloride (PVC) can be more easily recycled than vulcanized rubber. However, like vulcanized rubber, polyvinyl chloride floor coverings are generally relatively heavy, and therefore, have an undesirable effect on fuel economy. Generally, PVC also exhibits undesirable glossiness and poor tactility. Another disadvantage is that polyvinyl chloride must generally contain relatively high amounts of plasticizing agents in order to exhibit a desired flexibility for use as a floor covering material. Plasticizing agents tend to diffuse out of the polyvinyl chloride sheet material, volatilize and enter into the environment. The introduction of these plasticizing agents into the environment is highly undesirable.

An alternative to vulcanized rubber and polyvinyl chloride sheet materials for automotive flooring applications is thermoplastic olefin based materials. A problem with thermoplastic olefin based sheet materials is that they typically have a relatively glossy surface and poor tactility, rather than having a relatively high-friction surface as is commonly associated with rubber type materials. Thermoplastic olefins have a relatively smooth, glossy surface and plastic-like feel that is undesirable for floor covering applications.

Ethylene-vinyl acetate (EVA) laminates have also been used as vehicle floor covering materials. However, like the thermoplastic olefin based materials, the ethylene-vinyl acetate materials also exhibit high gloss and poor tactility. Further, the ethylene-vinyl acetate materials also exhibit poor grain retention (i.e., an embossed grain pattern provided to reduce gloss and improve tactility is partially or completely destroyed during normal use of a floor covering when subjected to temperatures frequently achieved during summer).

Conventional techniques used for reducing gloss in polymeric sheet materials, such as thermoplastic olefin based materials and ethylene-vinyl acetate materials have not been particularly effective. For example, while fillers have been successfully used to reduce gloss and improve tactility, the resulting filled material tends to exhibit poor abrasion resistance. Embossed grain patterns which may be created during an extrusion and/or calendering process, reduce glossiness of thermoplastic olefin based materials and ethylene-vinyl acetate materials. However, the surface finishes are lost or at least diminished during thermoforming processes which are required in order to conform the floor covering sheet material to the contours of a vehicle floor.

Accordingly, there remains a need for recyclable, environmentally friendly, sheet materials for vehicle floor covering applications, with good tactility similar to vulcanized rubber materials, good abrasion resistance, grain retention, and heat and ultraviolet light stability.

SUMMARY OF THE INVENTION

In one aspect of the invention, there is provided a polymer blend suitable for use in automotive floor covering applications. In particular, the polymer blends of this invention may be formed into sheet materials which are recyclable and which may exhibit low gloss and excellent tactility similar to vulcanized rubber. In addition, the polymer blends of this invention exhibit excellent grain retention, abrasion resistance, and heat and ultraviolet light stability.

The polymer blends of this invention include 100 parts by weight of a radial $(AB)_nBA$ block copolymer, wherein n is greater than 1. Each block A is a monoalkenyl arene polymer block, and each block B is an elastomeric conjugated diene polymer block. The blend further comprises from about 5 to about 200 parts by weight of a mineral oil, and from about 5 to about 300 parts by weight of a 1-olefin polymer.

In accordance with another aspect of the invention, there is provided a vehicle having a floor covering comprising a sheet material formed of a polymer blend containing 100 parts by weight of a radial $(AB)_nBA$ block copolymer, wherein n is greater than 1, each block A is a monoalkenyl arene polymer, each block B is an elastomeric conjugated diene polymer; about 5 to 200 parts by weight of a mineral oil; and from about 5 to about 300 parts by weight of a 1-olefin polymer.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
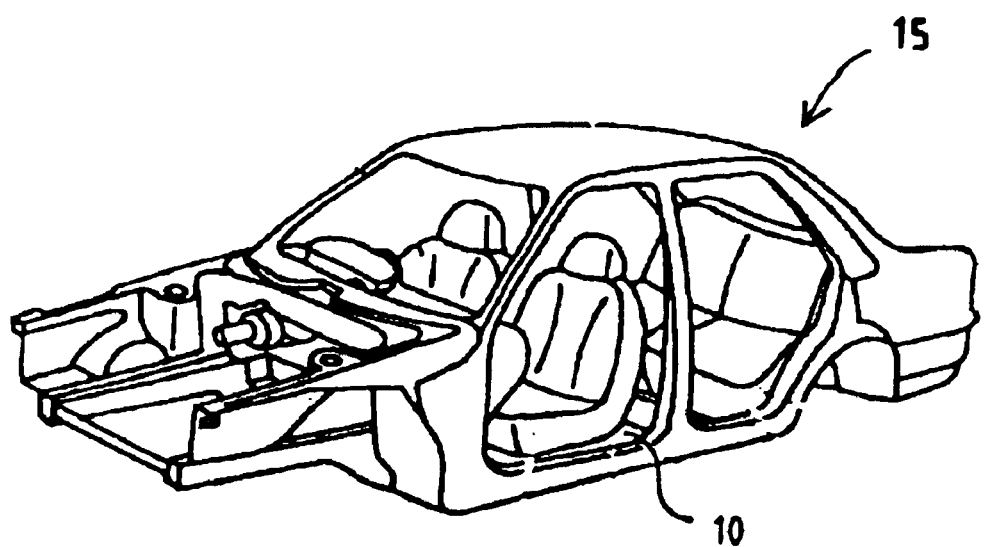
FIG. 1 is a perspective view of a vehicle floor having a floor covering made of sheet is material comprising a polymer blend according to the invention.

In this specification, the articles "a" and "an" are to be interpreted as meaning "at least one."

It has been discovered that a thermoformable sheet material which is recyclable and which is capable of achieving low gloss, excellent grain retention, and good tactility similar to vulcanized rubber can be achieved by blending specific types of radial block copolymers with mineral oil and 1-olefin polymers, in specific proportions. In addition, the polymer blends of this invention exhibit good abrasion resistance, heat stability, ultraviolet light stability, and are relatively inexpensive.

The radial block copolymers used in the polymer blends of this invention have the general formula $(A-B-)_nB-A$, wherein n is greater than 1. The A blocks are monoalkenyl arene polymer blocks typically having a weight average molecular weight between 5,000 and 75,000. The monoalkenyl arene polymer blocks are typically polystyrene blocks. However, the A blocks may comprise other monoalkenyl arenes such as alpha-methylstyrene. The B blocks are elastomeric conjugated diene polymer blocks typically having a weight average molecular weight between 15,000 and 300,000. Each conjugated diene polymer block B is derived by polymerization of conjugated dienes, preferably having 4–8 carbon atoms per molecule, such as butadiene, isoprene and mixtures thereof.

For every 100 parts by weight of radial $(AB)_nBA$ block copolymer, 5 to 200 parts by weight of a mineral oil are added to the polymer blend. Suitable mineral oils include paraffinic/naphthenic oils, which are usually fractions of refined petroleum products having less than about 30% by weight of aromatics (as determined by clay-gel analysis) and usually have viscosities between about 100 and 3000 SSU at 100° F. Commercially available mineral oils that are suitable for use in the invention include SHELLFLEX® oils, Nos. 310, 371, 311, and 734.

A description of suitable radial $(AB)_nBA$ block copolymers is provided in U.S. Pat. No. 3,594,452, which is incorporated by reference.

For every 100 parts by weight of the radial $(AB)_nBA$ block copolymer, about 5 to 300 parts by weight of a 1-olefin polymer is added to the polymer blend. The 1-olefin polymer can be a homopolymer of a 1-olefin monomer having from 3 to about 20 carbon atoms or a copolymer of at least two different 1-olefin monomers having from 2 to about 20 carbon atoms. In other words, the 1-olefin polymer can be generally any homopolymer or copolymer of 1-olefin monomers having up to about 20 carbon atoms except for polyethylene homopolymer. Examples of suitable 1-olefins monomers include propylene, 1-butene, 1-pentene, 1-hexene, 1-octene, 4-methyl-1-hexene, 4-ethyl-1-hexene, 6-methyl-1-heptene, and the like. The most suitable 1-olefin polymers have a melt flow index of from about 0.1 to about 20, and a melting point of at least 120° C. Preferred 1-olefin polymers include homopolymers and copolymers of propylene.

The compositions of this invention desirably contain at least about 2 parts by weight of carbon black for every 100 parts by weight of the resin, e.g., the radial $(AB)_nBA$ block copolymer, the 1-olefin polymer, and other optional resins. This is a level which is considerably higher than those levels typically utilized for imparting a black color (e.g. about 1 part or less per hundred parts by weight of resins). Suitable carbon black materials that may be used in the compositions of this invention include furnace blacks, channel blacks, lamp blacks, super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks and conducting channel blacks. Other carbon blacks which can be utilized include acetylene blacks. A mixture of two or more of the above carbon blacks can be used in preparing the compositions of this invention. The carbon blacks utilized in this invention preferably have an average particle size less than about 100 nm. In general, smaller particle sizes are preferred to provide better UV stability.

The resulting polymer blend comprising the radial block copolymer, carbon black (if desired), mineral oil, and 1-olefin polymer provide a thermoplastic elastomer that is well suited for use as a floor covering material, especially as a floor covering material in non-carpeted vehicles. The polymer blends of this invention may also have utility in other applications where a rubber-like feel or tactility is desired. However, unlike conventional vulcanized rubber, the polymer blends of this invention are thermoplastics, and therefore have the advantages of being thermoformable and recyclable.

The polymer blends of this invention may also contain, for every 100 parts by weight of the radial block copolymer, up to about 300 parts by weight of an olefin polymer such as those selected from polyethylene, ethylene-propylene monomer (EPM) rubbers, ethylene-propylene-diene monomer (EPDM) rubber, ethylene vinyl acetate (EVA) and the like, and linear styrene-butadiene-styrene block copolymers.

The polymer blends of this invention may also contain, for every 100 parts by weight of the radial block copolymer, up to about 300 parts by weight of a filler. Examples of fillers which may be used in the polymer blends of this invention include calcium carbonate, barium sulfate, clays, talc, alumina, silica, titanium dioxide, as well as certain dry fibrous fillers, such as polyester or acrylic fibers.

Additional minor amounts of antioxidants, ultraviolet light stabilizers, processing aids, pigments, and the like may also be added.

The components of this invention may be combined by processes known in the art including blending such as by extrusion, Banbury mixing or by dry-blending procedures. In the latter case, it is preferred that the block copolymer and other polymers be formed aground in particles having an average size less than about 4 millimeters diameter onto which the mineral oil is absorbed. Following this, the remaining components may be added and vigorously dry blended. Also, the various components may be melt blended. Sheet materials may be produced from the polymer blends of this invention by extrusion or by calendering. A desired texture or grain may be embossed into the sheet material during the calendering or extrusion process, either on one side or on both sides. Surface treatment in this manner may be used to further reduce gloss and improve tactility.

As shown in FIG. 1, a sheet of material formed of the polymer blend of this invention may be used as a floor covering 10 of a vehicle 15. Floor covering 10 may be thermoformed into any desired contour prior to installation into a vehicle. An advantage with the polymer blends of this invention is that the sheet materials may be provided with surface treatment, e.g., embossments, to provide an enhanced texture or grain, which is retained during normal use.

Figure 2:
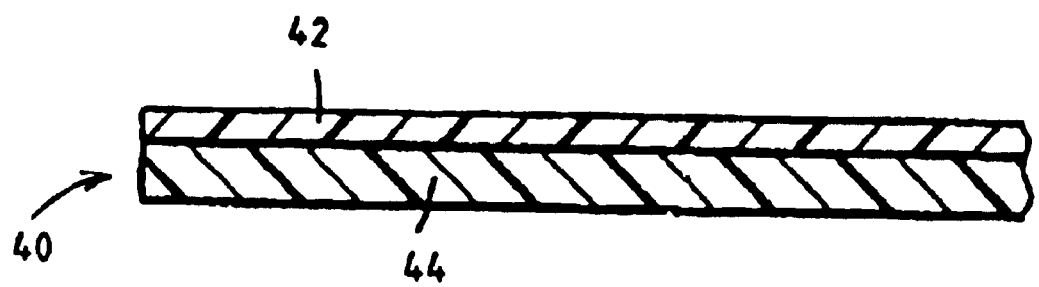
FIG. 2 is a cross-sectional view of a laminate incorporating a sheet material comprising a polymer blend according to the invention.

The sheet material formed of the polymer blend of this invention may be used as a layer in a laminate suitable for use as a vehicle panel or floor covering. Such laminates 40 (FIG. 2) or composites may comprise a top layer 42 or sheet made of the polymer blend of this invention attached to a thermal or sound insulating layer 44 (decoupler layer) comprised of a fibrous mat, polymer foam mat, or a polymer sheet. Fibrous mats include those comprised of shoddy (a combination of cotton fibers and a binder), glass fibers, synthetic resin fibers, natural fibers, and combinations of these. Suitable foam plastic layers include polyethylene, polystyrene, and polyurethane foam, etc. Suitable polymer sheets include relatively inexpensive polyethylene, polypropylene, polyurethane sheets, etc.

The surface of the sheet material of this invention may be mechanically embossed such as by passing the sheet through engraving rollers or plates to produce a desired embossed pattern, and/or chemically embossed such as by thermally decomposing a chemical blowing agent contained in the sheet material. Embossing techniques may be employed to create various textured surfaces such as hair cell pattern, sandblast pattern, or lavant pattern.

The sheet material of this invention is useful for floor and wall coverings, especially in vehicles, including trucks, cars, buses, airplanes, etc.

The sheet materials and laminates of this invention may also be employed as removable vehicle mats (throw mats).

The invention is further illustrated by the following examples, which are provided for illustrative purposes only and are not meant to limit the invention.

EXAMPLES

Table 1 lists six different formulations which were prepared, formed into sheet materials, and tested. The linear styrene-butadiene-styrene block copolymer used was VECTOR® 2518, whereas the radial styrene-butadiene-styrene block copolymer was VECTOR® 2411. The polypropylene used was a homopolymer with a melt flow index of 0.9. The polystyrene was a crystalline polystyrene from Nova Chemical Company and had a melt flow index of 6.5. The polyethylene employed was a high density polyethylene with a melt flow index of 4.5 and a density of 0.946. The oil employed was SHELLFLEX® 734 hydrocarbon oil. The carbon black which was used was Printex® XPB-080 from Cabot Corporation. The EPDM used was a 70 Mooney, low ENB content polymer. All of the formulations had a standard antioxidant package. The various formulations were compounded on a continuous compounding line at an average temperature of 420° F., and a 0.080 inch thick sheet was produced with a "sandblast" surface texture. The sheets were then vacuum formed using a matched die-set with diamond-shaped surface pattern and a contour to match a vehicle floor. The various samples were tested and the results are summarized in Table 2. Formulations 1, 3 and 4 are not in accordance with the invention; and Formulations 2, 5 and 6 are in accordance with the invention.

TABLE 1

| PHR FORMULATION | | | | | | |
|---|---|---|---|---|---|---|
| | 1 | 2 | 3 | 4 | 5 | 6 |
| SBS (Linear) | 100 | — | — | — | — | — |
| SBS (Radial) | — | 100 | 100 | 100 | 100 | 100 |
| Polypropylene | 100 | 100 | — | — | 300 | 100 |
| Polystyrene | — | — | — | 100 | — | — |
| Polyethylene | — | — | 100 | — | — | — |
| Oil | 50 | 50 | 50 | 50 | 100 | 50 |
| Carbon Black | 5 | 5 | 5 | 5 | 20 | 20 |
| EPDM | — | — | — | — | 225 | — |

TABLE 2

| | PROPERTIES | | | | | | |
|---|---|---|---|---|---|---|---|
| | Vulcanized Rubber Flooring | FORMULATION | | | | | |
| | | 1 | 2 | 3 | 4 | 5 | 6 |
| Tensile Strength-PSI (ASTM-D412) | | 1650 | 1610 | 1560 | 1950 | 1590 | 1640 |
| Hardness-Shore A (ASTM-D2240) | — | 92 | 91 | 90 | 94 | 91 | 92 |
| Grain Retention (1 Hour at 150° C.) | — | Very Good | Very Good | Poor | Very Good | Very Good | Very Good |
| UV Light Stability SAE J 1885 | | | | | | | |
| 225-6 KJ/m² @340 nm | — | Pass | Pass | Pass | Pass | Pass | Pass |
| 451-2 KJ/m² @340 nm Criteria: No loss of grain There shall be no more than a noticeable on-tone color change | — | Fail | Fail | Fail | Fail | Pass | Pass |
| Gloss (Visual) | Very Low | High | Very Low | Low | High | Very Low | Very Low |
| 60° Gloss Meter on Grained Surface | <1 | 2–8 | <1 | 1–2 | 3–6 | <1 | <1 |
| Tactility (Physical Touch) | Very Good | Very Good | Very Good | Very Good | Poor | Very Good | Very Good |

The data surprisingly show that when radial SBS was used with mineral oil and the required 1-olefin polymer selected from homopolymers and copolymers of 1-olefin monomers wherein at least one of the 1-olefin monomers has at least three carbon atoms, the resulting sheet material formed from the composition exhibited a very low gloss, excellent tactile properties, and good grain retention. A comparison of the test data for Formulations 1 and 2 illustrates the significance of utilizing a radial SBS block copolymer rather than a linear SBS block copolymer. More specifically, while Formulations 1 and 2 each exhibit very good grain retention, comparable UV stability, and good tactility, Formulation 1 exhibits undesirably high gloss, whereas Formulation 2 which contains the radial SBS block copolymer exhibits a desirable very low gloss. A comparison of the test results for Formulations 2 and 3 illustrate the importance of using the required polymer of 1-olefin monomer, wherein at least one of the 1-olefin monomers has at least three carbon atoms. In particular, the comparison of the test data for Formulations 2 and 3 show that the use of polypropylene rather than polyethylene achieves greatly improved grain retention, with other properties being comparable. A comparison of the test results for Formulations 2 and 4 show that the use of polystyrene in place of the polyethylene in Formulation 3 provides very good grain retention, comparable to that of the invention (Formulas 2, 5 and 6) but provides poor tactility and high gloss. The data for Formulations 5 and 6 illustrate that higher levels of carbon black provide improved UV stability without sacrificing other properties.

It was also discovered that styrene-butadiene-styrene based compounds may be utilized in automotive applications were there is exposure to UV radiation. Traditionally, styrene-butadiene-styrene based compounds were only used in applications where there was not any significant UV exposure. However, we have discovered that use of at least about 2 parts of carbon black per 100 parts of resin imparts excellent UV stability to compositions containing styrene-butadiene-styrene block copolymer.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A laminate comprising:
   a top sheet of material prepared from a polymer blend comprising 100 parts by weight of a radial block copolymer having formula $(AB)_nBA$, wherein n is greater than 1, each A is a monoalkenyl arene polymer block, and each B is a butadiene polymer block; from about 5 to about 200 parts by weight of a mineral oil; from about 5 to about 300 parts by weight of a 1-olefin polymer selected from homopolymers of a 1-olefin monomer having at least 3 carbon atoms and copolymers of 1-olefin monomers, wherein at least one of the 1-olefin monomers has at least 3 carbon atoms; and
   at least one layer of a fibrous material, a polymeric foam material, or a polymeric-sheet material attached to the top sheet.

2. The laminate of claim 1, wherein the monoalkenyl arene polymer blocks have a weight average molecular weight of from about 5,000 to about 75,000.

3. The laminate of claim 1, wherein the butadiene polymer blocks have a weight average molecular weight of from about 15,000 to about 300,000.

4. The laminate of claim 1, wherein the monoalkenyl arene polymer blocks are comprised of polystyrene, poly(alpha-methylstyrene), or a copolymer of styrene and alpha-methylstyrene.

5. The laminate of claim 1, wherein the 1-olefin polymer is a homopolymer or copolymer of propylene.

6. The laminate of claim 1, wherein the polymer blend further comprises a filler, said filler being present in an amount up to about 300 parts by weight in the polymer blend.

7. The laminate of claim 6, wherein the filler is selected from the group consisting of calcium carbonate, barium sulfate, clays, talc, alumina, silica, titanium dioxide, polyester fibers and acrylic fibers.

8. The laminate of claim 1, wherein the top sheet is chemically and/or mechanically embossed to provide a desired texture.

9. A vehicle floor covering comprising the laminate of claim 1.

10. The laminate of claim 1, further comprising at least about 2 parts by weight of carbon black.

11. A laminate comprising:
    a top sheet of material prepared from a polymer blend comprising 100 parts by weight of a radial block copolymer having formula $(AB)_nBA$, wherein n is greater than 1, each A is a monoalkenyl arene polymer block, and each B is an elastomeric conjugated diene polymer block; from about 5 to about 200 parts by weight of a mineral oil; from about 5 to about 300 parts by weight of a 1-olefin polymer selected from homopolymers of a 1-olefin monomer having at least 3 carbon atoms and copolymers of 1-olefin monomers, wherein at least one of the 1-olefin monomers has at least 3 carbon atoms; and
    at least one layer of a fibrous material, a polymeric foam material, or a polymeric sheet material attached to the top sheet; and
    wherein the 1-olefin polymer has a melt flow index from about 0.1 to about 20.

12. The laminate of claim 11, wherein the polymer blend further comprises a filler, said filler being present in an amount up to about 300 parts by weight in the polymer blend.

13. The laminate of claim 12, wherein the filler is selected from the group consisting of calcium carbonate, barium sulfate, clays, talc, alumina, silica, titanium dioxide, polyester fibers and acrylic fibers.

14. The laminate of claim 11, wherein the top sheet is chemically and/or mechanically embossed to provide a desired texture.

15. A vehicle floor covering comprising the laminate of claim 11.

16. The laminate of claim 11, further comprising at least about 2 parts by weight of carbon black.

17. A laminate comprising:
    a top sheet of material prepared from a polymer blend comprising 100 parts by weight of a radial block copolymer having formula $(AB)_nBA$, wherein n is greater than 1, each A is a monoalkenyl arene polymer block, and each B is an elastomeric conjugated diene polymer block; from about 5 to about 200 parts by weight of a mineral oil; from about 5 to about 0.300 parts by weight of a 1-olefin polymer selected from homopolymers of a 1-olefin monomer having at least 3 carbon atoms and copolymers of 1-olefin monomers, wherein at least one of the 1-olefin monomers has at least 3 carbon atoms; and
    at least one layer of a fibrous material, a polymeric foam material, or a polymeric sheet material attached to the top sheet; and
    wherein the polymer blend further comprises a polymer selected from the group consisting of polyethylene, ethylene-propylene monomer rubbers, ethylene-propylene-diene monomer rubbers, ethylene vinyl acetate copolymers, and styrene-butadiene-styrene block copolymers, said polymer being present in the polymer blend in an amount up to about 300 parts by weight.

18. The laminate of claim 17, wherein the polymer blend further comprises a filler, said filler being present in an amount up to about 300 parts by weight in the polymer blend.

19. The laminate of claim 18, wherein the filler is selected from the group consisting of calcium carbonate, barium sulfate, clays, talc, alumina, silica, titanium dioxide, polyester fibers and acrylic fibers.

20. The laminate of claim 17, wherein the top sheet is chemically and/or mechanically embossed to provide a desired texture.

21. A vehicle floor covering comprising the laminate of claim 17.

22. The laminate of claim 17, further comprising at least about 2 parts by weight of carbon black.

* * * * *

UNITED STATES PATENT AND TRADEMARK OFFICE
CERTIFICATE OF CORRECTION

PATENT NO. : 6,846,571 B1
DATED : January 25, 2005
INVENTOR(S) : Raj K. Agrawal

It is certified that error appears in the above-identified patent and that said Letters Patent is hereby corrected as shown below:

Column 2,
Line 49, delete "is".

Column 3,
Line 37, "1-olefins." should be -- 1-olefin --.

Column 8,
Line 32, "0.300" should be -- 300 --.

Signed and Sealed this

Tenth Day of May, 2005

JON W. DUDAS
*Director of the United States Patent and Trademark Office*